(12) United States Patent
Tobita et al.

(10) Patent No.: US 10,807,288 B2
(45) Date of Patent: Oct. 20, 2020

(54) MOLD CLAMPING APPARATRUS, MOLDING APPARATUS AND MOLDING METHOD

(71) Applicant: Toshiba Kikai Kabushiki Kaisha, Tokyo-to (JP)

(72) Inventors: Hideaki Tobita, Numazu (JP); Keisuke Mori, Numazu (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 371 days.

(21) Appl. No.: 15/551,793

(22) PCT Filed: Feb. 12, 2016

(86) PCT No.: PCT/JP2016/054151
§ 371 (c)(1),
(2) Date: Aug. 17, 2017

(87) PCT Pub. No.: WO2016/133021
PCT Pub. Date: Aug. 25, 2016

(65) Prior Publication Data
US 2018/0029272 A1 Feb. 1, 2018

(30) Foreign Application Priority Data
Feb. 19, 2015 (JP) .................. 2015-030726

(51) Int. Cl.
B29C 45/66 (2006.01)
B29C 45/76 (2006.01)
B22D 17/26 (2006.01)

(52) U.S. Cl.
CPC .......... B29C 45/66 (2013.01); B22D 17/26 (2013.01); B22D 17/263 (2013.01); B29C 45/76 (2013.01);
(Continued)

(58) Field of Classification Search
None
See application file for complete search history.

(56) References Cited

U.S. PATENT DOCUMENTS

| 4,828,475 A * | 5/1989 | Kamiguchi ............ B29C 45/66 425/150 |
| 5,362,222 A | 11/1994 | Faig et al. |
| 2010/0227014 A1 | 9/2010 | Kato et al. |

FOREIGN PATENT DOCUMENTS

| DE | 10 2012 007 833 | 10/2012 |
| JP | 09-076318 | 3/1997 |

(Continued)

OTHER PUBLICATIONS

International Search Report issued in PCT/JP2016/054151 dated May 10, 2016.
(Continued)

*Primary Examiner* — Monica A Huson
(74) *Attorney, Agent, or Firm* — DLA Piper LLP US

(57) ABSTRACT

A mold clamping apparatus according to the present invention includes: a fixed platen to which one mold of a pair of molds is to be mounted; a movable platen which is disposed opposite the fixed platen and to which the other mold is to be mounted; a pressure-receiving platen connected to the fixed platen via tie bars; a mold opening/closing mechanism including a toggle link mechanism for opening/closing and clamping the molds by moving the movable platen back and forth; a drive mechanism including a servo motor for driving the mold opening/closing mechanism; and a control device for controlling the servo motor, wherein the control device includes an acceleration/deceleration adjustment section capable of adjusting an acceleration time, a deceleration time and a target speed of the servo motor during a mold clamping operation.

19 Claims, 5 Drawing Sheets

(52) U.S. Cl.
CPC ........ *B29C 45/7653* (2013.01); *B29C 45/661* (2013.01); *B29C 2945/76505* (2013.01); *B29C 2945/76598* (2013.01); *B29C 2945/76602* (2013.01); *B29C 2945/76709* (2013.01)

(56) References Cited

FOREIGN PATENT DOCUMENTS

| | | |
|---|---|---|
| JP | 2001-219454 | 8/2001 |
| JP | 2003-071895 | 3/2003 |
| JP | 2006-281698 | 10/2006 |
| JP | 2009-292092 | 12/2009 |
| JP | 2010-105291 | 5/2010 |
| JP | 2011-088322 | 5/2011 |
| WO | WO 01/58662 | 8/2001 |

OTHER PUBLICATIONS

Written Opinion issued in PCT/JP2016/054151 dated May 10, 2016.
International Preliminary Report on Examination issued in PCT/JP2016/054151 dated Nov. 11, 2016.
English Language Abstract of JP 2003-071895 published Mar. 12, 2003.
English Language Abstract of JP 2001-219454 published Aug. 14, 2001.
English Language Abstract of JP 2006-281698 published Oct. 19, 2006.
English Language Abstract of JP 2009-292092 published Dec. 17, 2009.
English Language Abstract of JP 2011-088322 published May 6, 2011.
English Language Abstract of JP 2010-105291 published May 13, 2010.
English Language Abstract of JP 09-076318 published Mar. 25, 1997.
German Office Action in DE Application No. 112016000837.6 dated Jun. 7, 2019.
Indian Office in IN Application No. 201717029304 dated May 27, 2020.

* cited by examiner

MOLD CLAMPING APPARATRUS, MOLDING APPARATUS AND MOLDING METHOD

CROSS REFERENCE TO RELATED APPLICATIONS

This application is a U.S. National Stage Application of International Application No. PCT/JP2016/054151 filed Feb. 12, 2016, which claims priority from Japanese Patent Application No. 2015-030726 filed Feb. 19, 2015. The entirety of all the above-listed applications are incorporated herein by reference.

TECHNICAL FIELD

Embodiments of the present invention relate to a mold clamping apparatus, a molding apparatus and a molding method for use in injection molding, die casting, etc.

BACKGROUND OF THE INVENTION

A toggle link-type mold clamping apparatus has been used in a molding apparatus, such as an injection molding machine or a die-casting machine. In a toggle link-type mold clamping apparatus, mold closing is completed when a toggle link mechanism extends and brings a movable mold, mounted to a movable platen, into contact with a fixed mold mounted to a fixed platen. The toggle link mechanism continues to extend, thereby further extending tie bars. This can generate a large mold clamping force. The operation of extending the toggle link mechanism after mold closing to generate a mold clamping force is called a lock-up operation (mold clamping operation).

In the case of molding a lot of products e.g. by injection molding, a reduction in a molding cycle leads directly to an increase in the production efficiency and a reduction in the production cost. In view of this, attempts have been made to speed up a mold opening/closing operation in a toggle link-type mold clamping apparatus. In addition, various improvements have been made to reduce the time for the lock-up operation, ranging from the time of mold closing before generation of a mold clamping force to the time of generation of a predetermined clamping force (see, for example, patent documents 1 to 3).

According to patent document 1, the position of a pressure-receiving platen is adjusted so that the maximum mold clamping force is generated when the arms of a toggle link mechanism are at their most extended positions, and a crosshead is advanced in a stroke range of a relatively low force magnification ratio before the toggle link arms extend most. This reduces the travel distance of the crosshead, thereby reducing the time required for mold clamping.

Patent document 2 has proposed a method for reducing the mold clamping time in a mold clamping apparatus which drives a toggle link mechanism by means of a hydraulic cylinder. The method involves controlling the rotational speed of a pump motor, which supplies a hydraulic oil to the hydraulic cylinder, along the peak load characteristics.

Patent document 3 has proposed to set a time constant upon acceleration and deceleration of a movable platen in order to control the acceleration and deceleration of the movable platen with the optimal acceleration characteristics and deceleration characteristics, thereby reducing vibration and impact applied to the movable platen and reducing the operating time required for mold opening/closing and mold clamping.

Attempts to reduce mold clamping time have thus been made through various approaches.

PRIOR ART DOCUMENTS

Patent Documents

Patent document 1: Japanese Patent Laid-Open Publication No. 2011-088322
Patent document 2: Japanese Patent Laid-Open Publication No. 2010-105291
Patent document 3: Japanese Patent Laid-Open Publication No. H09-076318

SUMMARY OF THE INVENTION

However, in the case of a power-operated mold clamping apparatus which performs mold opening/closing and mold clamping by means of a power-driven toggle link mechanism, the time required for mold clamping cannot be reduced due to a motor torque restriction during the lock-up operation.

In particular, a motor needs to be accelerated/decelerated in the course of the lock-up operation; however, no appropriate adjustment of the acceleration/deceleration of the motor has heretofore been made. If an attempt is made to reduce the mold clamping time, torque saturation is likely to occur in the motor. An adjustment of the motor to avoid this problem may result in an increase in the time required for mold clamping.

The present invention has been made in view of the above problems in the prior art. It is therefore an object of the present invention to provide a mold clamping apparatus, a molding apparatus and a molding method which make it possible to reduce the time required for mold clamping while preventing torque saturation of a motor during the lock-up operation of a toggle link mechanism, and can therefore contribute to a reduction in a cycle time.

In order to achieve the object, the present invention provides a mold clamping apparatus comprising: a fixed platen to which one of a pair of molds is to be mounted; a movable platen which is disposed opposite the fixed platen and to which the other mold is to be mounted; a pressure-receiving platen connected to the fixed platen via tie bars; a mold opening/closing mechanism including a toggle link mechanism for opening/closing and clamping the molds by moving the movable platen back and forth; a drive mechanism including a servo motor for driving the mold opening/closing mechanism; and a control device for controlling the servo motor, wherein the control device includes an acceleration/deceleration adjustment section capable of adjusting an acceleration time, a deceleration time and a target speed of the servo motor during a mold clamping operation.

The present invention also provides a molding apparatus comprising the above mold clamping apparatus.

Further, the present invention also provides a molding method performed by using the above molding apparatus, comprising the steps of: adjusting the acceleration time, the deceleration time and the target speed of the servo motor so that an acceleration torque and a mold clamping force generating torque of the servo motor are generated with different timings during the mold clamping operation of the mold opening/closing mechanism; and performing the mold clamping operation with the adjusted acceleration time, deceleration time and target speed, and then filling a molding material into the clamped molds to mold a product.

to BRIEF DESCRIPTION OF THE DRAWINGS

DESCRIPTION OF EMBODIMENTS

Embodiments of the mold clamping apparatus, the molding apparatus and the molding method according to the present invention will now be described with reference to the attached drawings.

Figure 1:
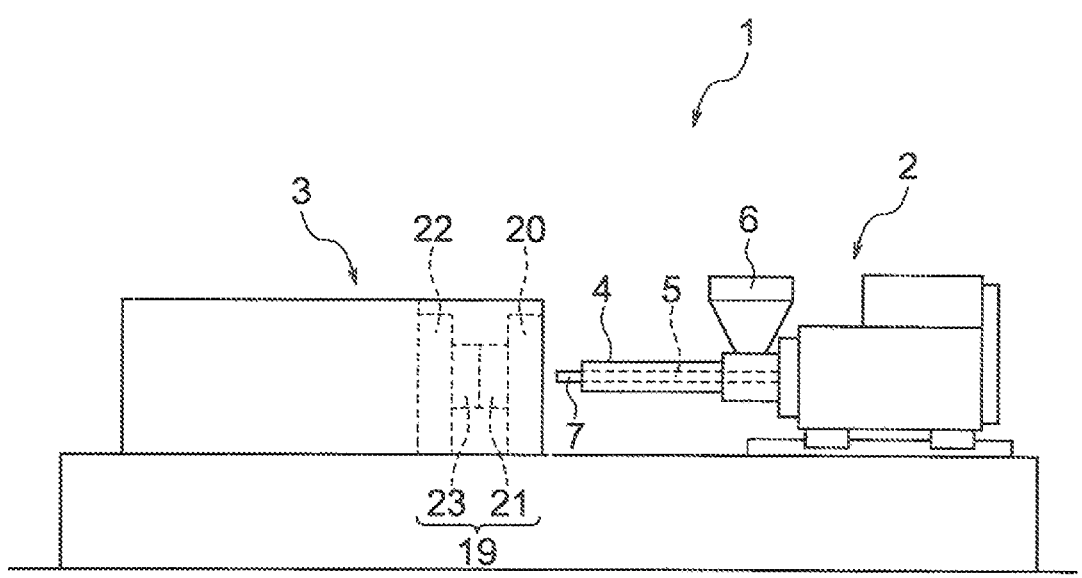
FIG. 1 is a diagram schematically showing an injection molding machine in which a mold clamping apparatus according to an embodiment of the present invention is applied.

FIG. 1 is a diagram showing a schematic construction of an injection molding machine (molding apparatus) 1 in which a mold clamping apparatus according to an embodiment of the present invention is applied. In FIG. 1, reference numeral 2 denotes an entire injection apparatus of the injection molding machine 1. Reference numeral 3 denotes the mold clamping apparatus (mold opening/closing apparatus, opening/closing apparatus) of the injection molding machine 1.

A screw 5 is rotatably and axially movably inserted into a barrel 4 of the injection apparatus 2. A resin (molding material, material) is fed from a hopper 6 into the barrel 4. A not-shown heater for heating the resin is disposed around the barrel 4. In the injection apparatus 2, the screw 5 is rotated by a not-shown measuring motor to accumulate the resin in an anterior region in the barrel 4 while melting and kneading the resin and to thereby weigh the resin. The resin that has been accumulated in the anterior region in the barrel 4 is injected from a nozzle 7 into a cavity, formed in a mold 19, by advancing the screw 5 by means of an injection motor, a ball screw and a nut, all not shown.

Figure 2:
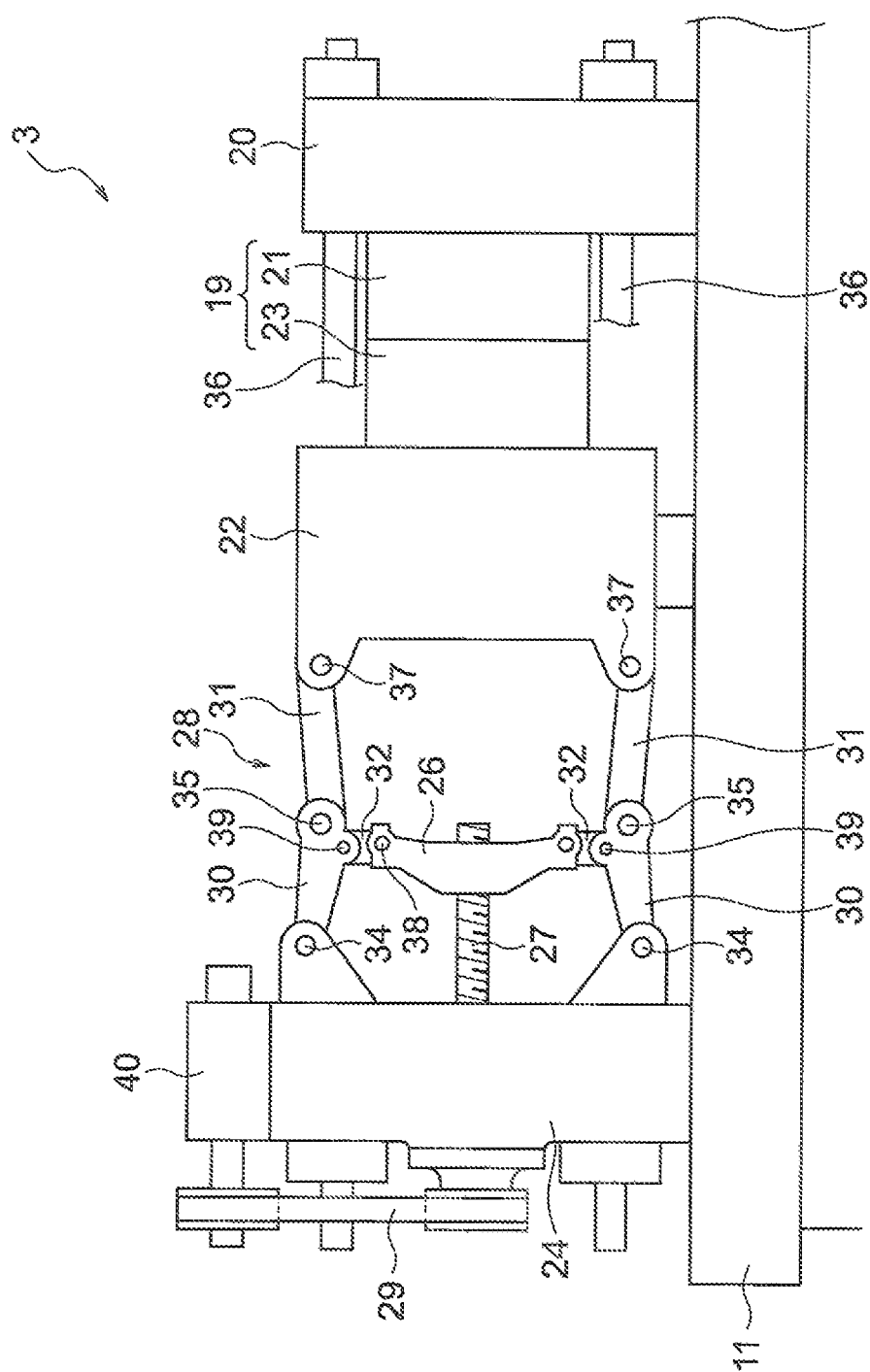
FIG. 2 is a side view schematically showing the mold clamping apparatus according to the embodiment of the present invention.

FIG. 2 is a side view schematically showing the mold clamping apparatus 3 of this embodiment.

A fixed die plate (fixed platen) 20 is fixed at one end of a frame 11 of the mold clamping apparatus 3. A pressure-receiving platen 24 is disposed at the other end of the frame 11. A movable die plate (movable platen) 22, located between the fixed die plate 20 and the pressure-receiving platen 24, is movably installed on the frame 11. A fixed mold (the other mold, one mold) 21 is mounted to the fixed die plate 20, while a movable mold (one mold, the other mold) 23 is mounted to the movable die plate 22. The mold 19 consists of the fixed mold 21 and the movable mold 23. A cavity for a molded product is formed in the mold 19, i.e. when the fixed mold 21 and the movable mold 23 are closed.

The fixed die plate 20 and the pressure-receiving platen 24 are connected via a plurality of (e.g. four) tie bars 36. Upon the mold clamping operation of clamping the mold 19 after the mold closing operation of closing the mold 19, the tie bars 36 are subjected to a mold clamping force exerted by a toggle link mechanism (toggle mechanism, mold clamping mechanism, mold opening/closing mechanism) 28.

As shown in FIG. 2, the toggle link mechanism 28 includes, for example, a pair of upper toggle links and a pair of lower toggle links, each toggle link consisting of a first link 30, a second link 31 and a third link 32. FIG. 2 shows one of the upper toggle links and one of the lower toggle links. All the toggle links have the same construction.

One end of the first link 30 is connected to the pressure-receiving platen 24 via a toggle pin 34. The other end of the first link 30 is connected to one end of the second link 31 via a toggle pin 35. The other end of the second link 31 is connected to the movable die plate 22 via a toggle pin 37.

In FIG. 2, reference numeral 26 denotes a crosshead connected to the toggle link mechanism 28.

One end of the third link 32 is connected to the crosshead 26 via a toggle pin 38. The other end of the third link 32 is connected to the first link 30 via a toggle pin 39.

In this embodiment the pressure-receiving platen 24 is provided with a servo motor (drive, mold clamping drive, electric motor) 40 as a drive source for the toggle link mechanism 28. A not-shown nut portion of a ball screw mechanism, which converts rotation of the servo motor 40 into a translational movement and transmits the movement to the toggle link mechanism 28, is provided in the center of the crosshead 26. A ball screw 27 is in engagement with the nut portion. Rotation of the servo motor 40 is transmitted to the ball screw 27 via a timing belt 29. In this embodiment the combination of the servo motor 40, the ball screw 27 and the nut portion of the ball screw mechanism may sometimes be referred to as a drive mechanism or a mold clamping drive mechanism.

The mold clamping operation the mold clamping apparatus will now be described.

FIG. 2 shows the state of the mold clamping apparatus when the first links 30 and the second links 31 of the toggle link mechanism 28 are extended and the mold 19 is closed.

When the servo motor 4 is driven to move (advance) the crosshead 26 in the mold closing direction (rightward in FIG. 2), the first links 30 and the second links 31 extend, whereby the movable die plate 22 advances toward the fixed die plate 20 in order to close the mold 19. The mold closing is completed when the movable mold 23 comes into contact with the fixed mold 21. At this point of time, no mold clamping force has yet been generated by the toggle link mechanism 28.

Subsequently, in order to generate a mold clamping force, the following lock-up operation is started by further rotating the servo motor 40. Although the crosshead 26 then advances, the mold 19 has already been closed, i.e. the movable mold 23 has been in contact with the fixed mold 21. Accordingly, instead of moving the movable die plate 22, the toggle link mechanism 28 extends the tie bars 36 toward the pressure-receiving platen 24. When the toggle link mechanism 28 is thus extended while the movable mold 23 is in contact with the fixed mold 21, the movable mold 23 does not move, but the tie bars 36 extend. The reaction force of the force that extends the tie bars 36 generates a mold clamping force that strongly presses the movable mold 23 against the fixed mold 21, and the mold clamping force increases gradually. By extending the toggle link mechanism 28 in this manner, the movable mold 23 is eventually clamped to the fixed mold 21 with a predetermined clamping force. The servo motor 40 is then stopped to terminate the lock-up operation.

After completion of the lock-up operation, a resin as a molding material is filled into the cavity in the mold 19 by means of the injection apparatus 2. When the crosshead 26 then moves in the mold opening direction (leftward in FIG. 2), the first links 30 and the second links 31 are bent by the third links 32. Accordingly, the movable die plate 22 moves backward and opens the mold 19.

Figure 3:
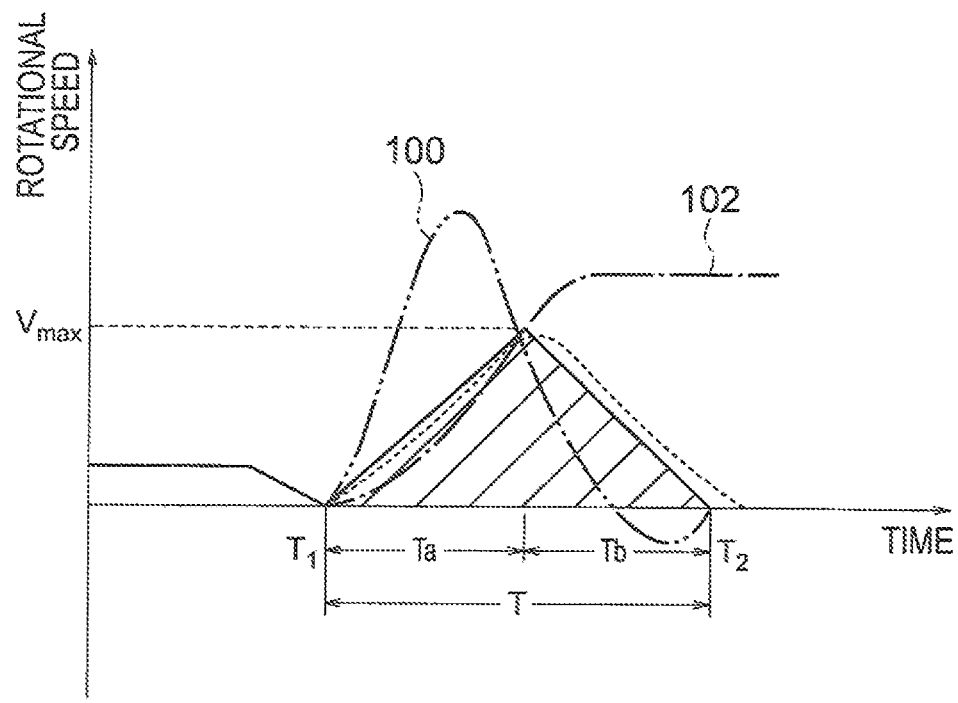
FIG. 3 is a diagram showing an example of a change pattern of a servo motor speed instruction in the lock-up operation of the mold clamping apparatus.
Figure 4:
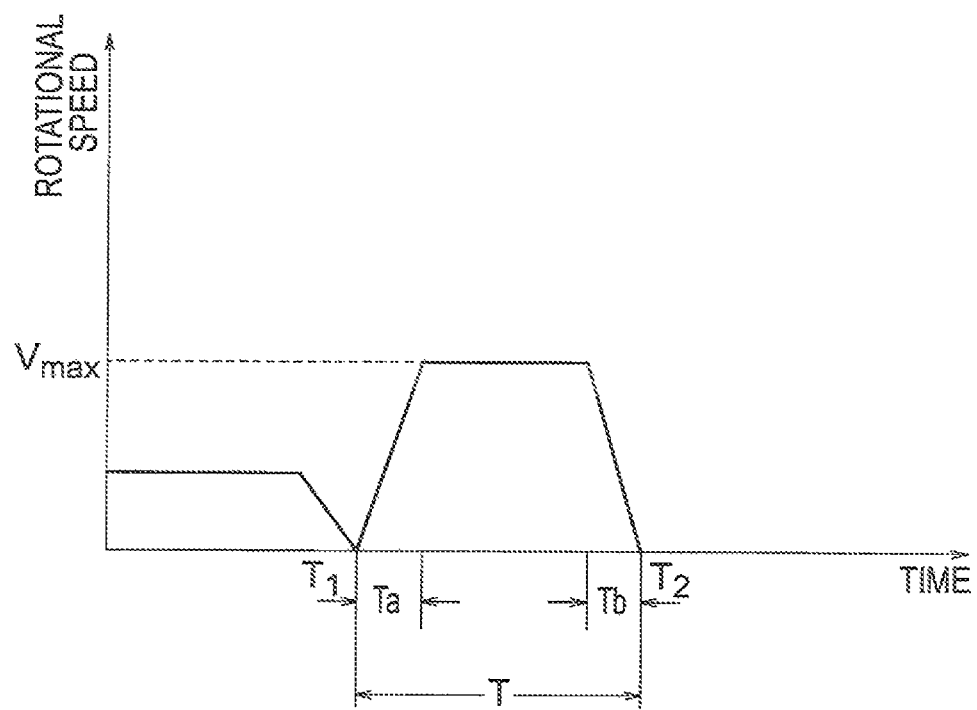
FIG. 4 is a diagram showing another example of a change pattern of a servo motor speed instruction in the lock-up operation of the mold clamping apparatus.

FIGS. 3 and 4 each show a change pattern of a speed instruction for the servo motor 40 in the above-described lock-up operation.

FIG. 3 is a diagram showing a conventional change pattern of a speed instruction for the rotation of the servo motor 40 in the lock-up operation. In FIG. 3, the abscissa axis represents time, and the ordinate axis represents the rotational speed of the servo motor 40.

Referring to FIG. 3, the solid line represents a curve (speed instruction curve) showing a change pattern of a speed instruction for the servo motor 40, and the broken line represents a speed feedback curve.

T1 represents a point in time at which the mold closing is completed and the lock-up operation is started, and T2 represents a point in time at which the lock-up operation is terminated. Therefore T indicates the time required for the lock-up operation.

In the speed instruction change pattern of FIG. 3, the rotation of the servo motor 40 is accelerated at a constant acceleration during an acceleration time Ta and, after the maximum speed (target speed, target rotational speed) $V_{max}$ is reached, the rotation of the servo motor 40 is decelerated for a deceleration time Tb. The cumulative number of revolutions of the servo motor 40 during the period from the start to the completion of the lock-up operation is constant; therefore, the area of the shaded region bounded by the speed instruction curve and the abscissa time axis, shown in FIG. 3, is constant regardless of the speed instruction pattern.

When the speed instruction change pattern of FIG. 3 is set, the torque of the servo motor 40 may change in the torque curve 100: the torque of the servo motor 40 increases with acceleration and reaches the peak before the maximum speed $V_{max}$ is reached. A set clamping force is generated after the maximum speed $V_{max}$ is reached, as indicated by the curve 102.

In the case of the lock-up operation, the torque generated during the acceleration of rotation of the servo motor 40 includes a torque (acceleration torque) necessary to accelerate the rotation of the servo motor 40 and a torque (clamping force generating torque) necessary for the toggle link mechanism 28 to extend the tie bars 36.

It is conceivable that in the case of the torque curve 100 shown in FIG. 3, the acceleration torque and the clamping force generating torque overlap each other. Therefore, the torque may increase greatly in the acceleration interval, and torque saturation can occur in the servo motor 40.

FIG. 4 shows another change pattern of a speed instruction for the servo motor 40 in the lock-up operation. In the speed instruction change pattern of FIG. 4, the acceleration time Ta during which the rotation of the servo motor 40 is accelerated at a constant acceleration is set short. After the maximum speed $V_{max}$ is reached, the speed is maintained for a certain time, and then the rotation of the servo motor 40 is decelerated for a short deceleration time Tb.

The speed change pattern can thus be varied by adjusting the acceleration time Ta, the deceleration time Tb and the maximum speed $V_{max}$ for the rotation of the servo motor 40. It is therefore conceivable that an adjustment of the servo motor 40 can adjust the torque of the servo motor 40 or change the time T required for the lock-up operation.

Therefore, the mold clamping apparatus 3 of this embodiment uses a control device which is provided with the following acceleration/deceleration adjustment means so that the acceleration time Ta, the deceleration time Tb and the maximum speed $V_{max}$ for the rotation of the servo motor 40 can be variably adjusted in the lock-up operation.

Figure 5:
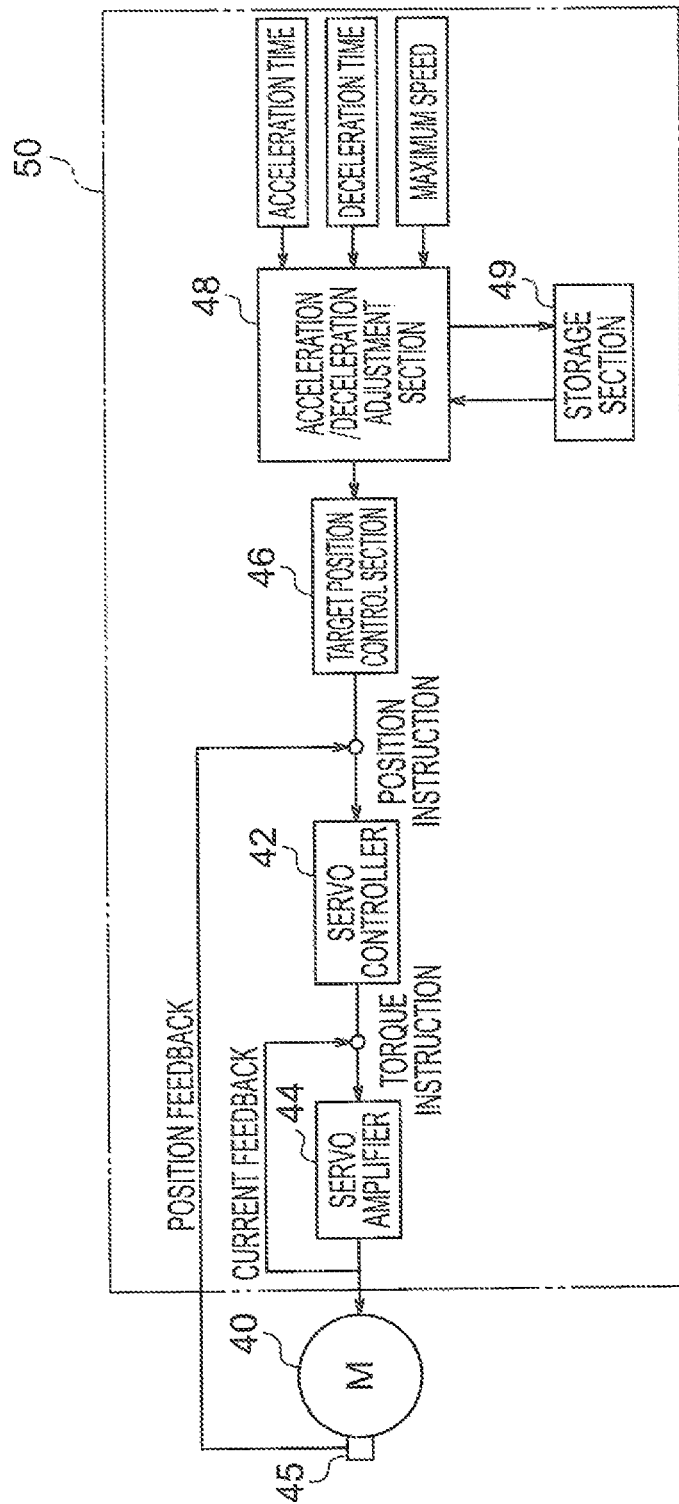
FIG. 5 is a block diagram of a control device provided in the mold clamping apparatus.

FIG. 5 is a block diagram of the acceleration/deceleration adjustment means provided in the control device 50 of the mold damping apparatus 3. The position and speed of rotation of the servo motor 40 are controlled so that they follow an instruction by means of a servo mechanism including a servo controller 42 and a servo amplifier 44. A position instruction is given to the servo controller 42 by a target position control section 46.

The rotational angle (rotational position) of the servo motor 40 is detected by an encoder 45. A position feedback rule and a speed feedback rule are created by using the detected rotational angle of the servo motor 40. A torque instruction outputted by the servo controller 42 is compared to a current feedback that flows in the servo motor 40 by a voltage instruction from the servo amplifier 44, and the deviation is amplified by the servo amplifier 44 and applied to the servo motor 40. The target position control section 46 calculates a position instruction, which is to be given to the servo controller 42, e.g. based on the speed instruction curve shown in FIG. 4.

The control device 50 is provided with an acceleration/deceleration adjustment section 48, comprised of hardware such as an electronic circuit, or software, so that the acceleration time Ta, the deceleration time Tb and the maximum speed $V_{max}$ for the rotation of the servo motor 40 in the lock-up operation can be adjusted. Parameters necessary for control of the servo motor 40 and data on adjusted speed change patterns are stored in the storage section 49.

When values of the acceleration time Ta, the deceleration time Tb and the maximum speed $V_{max}$ are inputted into the acceleration/deceleration adjustment section 48 or when the values are varied for adjustment, the acceleration/deceleration adjustment section 48 creates a speed instruction, charge pattern according to the values. The acceleration/deceleration adjustment section 48 calculates a position instruction based on the adjusted speed instruction change pattern, and outputs the position instruction to the target position control section 46.

The adjustment of the acceleration time Ta, the deceleration time Tb and the maximum speed $V_{max}$ for the rotation of the servo motor 40 in the lock-up operation will now be described in detail with reference to FIG. 6.

A description is first given of the adjustment of the acceleration time Ta and the maximum speed $V_{max}$.

The acceleration time Ta is the time it takes for the rotational speed of the servo motor 40 to reach the maximum speed $V_{max}$. If the acceleration time Ta is adjusted to be long, then the acceleration becomes low. Conversely, if the acceleration time Ta is adjusted to be short, then the acceleration becomes high.

As described above, the torque of the servo motor 40 is used as an acceleration torque necessary to accelerate the rotation of the servo motor 40, and also as a clamping, force generating torque necessary for the toggle link mechanism 28 to extend the tie bars 36. If the acceleration time Ta is adjusted to be short, the torque of the servo motor 40 is used exclusively to accelerate the rotation of the servo motor 40 in the initial stage of the lock-up operation.

Figure 6:
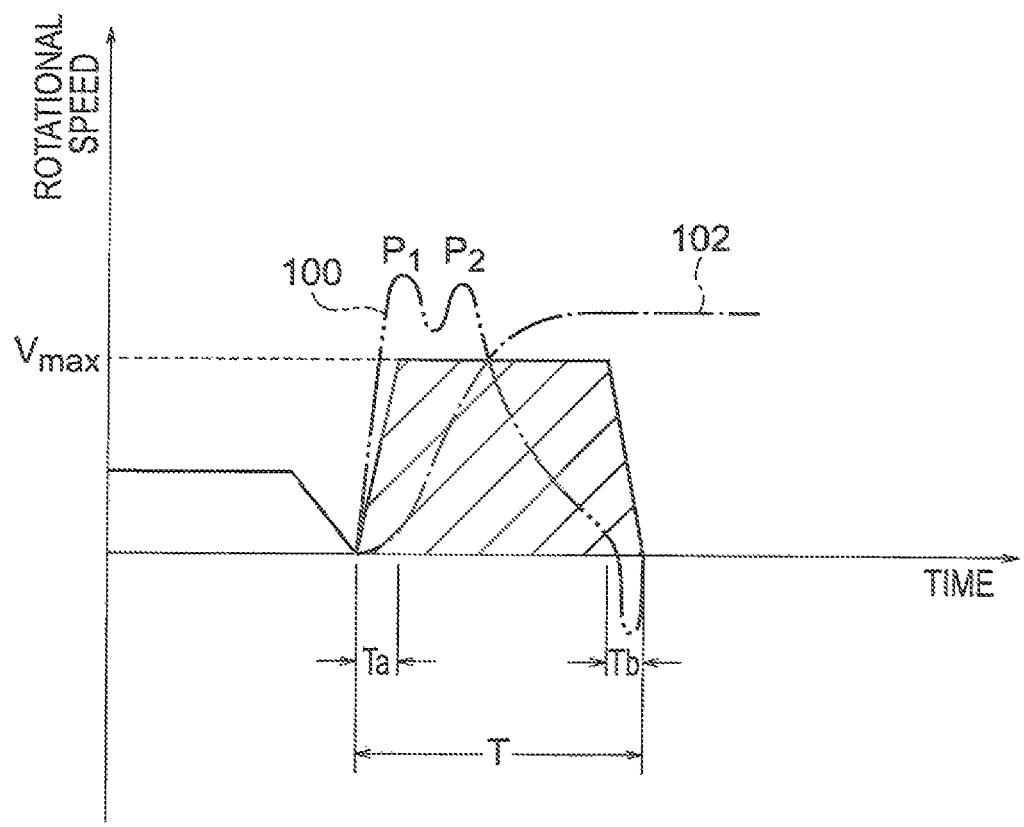
FIG. 6 is a diagram showing an example of adjustment of an acceleration time, a deceleration time and a target speed of a servo motor, according to an embodiment of the present invention.

As shown by the clamping force curve 102 in FIG. 6, the clamping force generated in the acceleration interval is low. Therefore, the peak P1 that first appears in the torque curve 100 is considered to be the peak of the acceleration torque.

On the other hand, the clamping force increases rapidly after the acceleration has ended and the rotational speed of the servo motor 40 has reached the maximum speed $V_{max}$. The second peak P2 appears in the torque curve 100 with the same timing as the rapid increase in the mold clamping force. The torque peak P2 is considered to indicate that the torque of the servo motor 40 is used to extend the tie bars 36 and generate a mold clamping force.

By thus reducing the acceleration time Ta, and appropriately adjusting the acceleration time Ta and the maximum speed $V_{max}$, it becomes possible to make the peak P1 of the acceleration torque and the peak P2 of the clamping force generating torque occur with different timings. Thus, it becomes possible to make the acceleration torque and the clamping force generating torque not overlap each other. This prevents torque saturation of the servo motor 40 and reduces the torque generated in the servo motor 40. Furthermore, the capacity of the servo motor 40 and the capacity of the servo amplifier 44 can be decreased.

While the adjustment of the acceleration time Ta and the maximum speed $V_{max}$ has been described from the viewpoint of prevention of torque saturation, the same adjustment has a great effect also on the reduction of the time T from the start to the completion of the lock-up operation.

In particular, the adjustment of the acceleration time Ta, the deceleration time Tb and the maximum speed $V_{max}$ is made under the constraint condition that the area of the region bounded by a speed instruction change curve is constant.

As will be appreciated from comparison between the speed instruction change pattern shown in FIG. 3 and the speed instruction change pattern shown in FIG. 6, the time T from the start to the completion of the lock-up operation is shorter in the pattern of FIG. 6 because the shaded regions have the same area. In an experiment which was conducted using a real machine, the time T in the pattern of FIG. 3 was found to be 520 [msec], while the time T in the pattern of FIG. 6 was found to be 300 [msec].

It will be understood in this connection that with reference to a trapezoidal region bounded by a speed instruction change curve, the time T can be reduced by setting the acceleration time Ta and the deceleration time Tb to be shorter and setting the maximum speed $V_{max}$ to be higher under the constraint condition that the area of the trapezoidal region is constant.

As described above, by making an adjustment based on a reduction in the acceleration time Ta, the acceleration torque and the mold clamping force generating torque can be generated with different timings, thereby making it possible to prevent torque saturation. In addition, it becomes possible to reduce the time T from the start to the completion of the lock-up operation.

The deceleration time Tb is adjusted independently of the acceleration time Ta. During the deacceleration of rotation of the servo motor 40, friction in the toggle link mechanism 28, etc. contributes to the reduction of the torque. The deceleration time Tb can therefore be adjusted to be shorter than the acceleration time Ta. This makes it possible to further reduce the time T from the start to the completion of the lock-up operation.

Upon completion of the above-described adjustment of the acceleration time Ta, the deceleration time Tb and the maximum speed $V_{max}$, data on the adjusted speed instruction is stored in the storage section 49 shown in FIG. 5.

In an actual mold clamping process of an injection molding cycle, the lock-up operation for mold clamping is performed while accelerating/decelerating the servo motor 40 in conformity with an adjusted speed instruction change curve.

A reduction in the mold clamping time of a molding cycle is very short relative to the molding cycle which is generally a few seconds in the case of injection molding. However, in a mass production molding process in which molding cycles are repeated sequentially for a long period of time, the cumulative time reduction can contribute greatly to an increase in the efficiency of the molding process and a reduction in the production cost.

While the mold clamping apparatus, the molding apparatus and the molding method of the present invention have been described with reference to preferred embodiments, it is understood that the present invention is not limited to the embodiments described above. For example, it is possible to prepare a plurality of speed instruction patterns, such as the speed instruction pattern shown in FIG. 3 and the speed instruction pattern shown in FIG. 6, and to switch between the prepared speed instruction patterns depending on the molding conditions, etc.

Further, the present invention can also be applied in other molding apparatuses such as a die-casting machine.

The invention claimed is:

1. A mold clamping apparatus comprising:
   a fixed platen coupled to a first mold of a pair of molds;
   a movable platen which is disposed opposite the fixed platen and coupled to a second mold of the pair of the molds;
   a pressure-receiving platen connected to the fixed platen via tie bars;
   a mold opening/closing mechanism including a toggle link mechanism for opening/closing and clamping the molds by moving the movable platen back and forth;
   a drive mechanism including a servo motor for driving the mold opening/closing mechanism; and
   a servo motor controller configured to control the servo motor, wherein the servo motor controller includes an acceleration/deceleration adjustment electronic circuit configured to adjust an acceleration time, a deceleration time and a target speed of the rotation of the servo motor during a mold clamping operation.

2. The mold clamping apparatus according to claim 1, wherein the acceleration/deceleration adjustment electronic circuit can adjust the acceleration time, the deceleration time and the target speed of the rotation of the servo motor so that an acceleration torque and a mold clamping force generating torque of the servo motor are generated at different times.

3. The mold clamping apparatus according to claim 1, wherein the acceleration/deceleration adjustment electronic circuit is configured to adjust the acceleration time, the deceleration time and the target speed of the rotation of the servo motor so that a peak of an acceleration torque and a peak of a clamping force generating torque occur at different times.

4. The mold clamping apparatus according to claim 2, wherein the acceleration/deceleration adjustment electronic circuit is configured to adjust the acceleration time, the deceleration time and the target speed under the constraint condition of the rotation of the servo motor so that the area of a region, bounded by a speed instruction curve which shows temporal change in speed instruction and by the time axis, is constant.

5. The mold clamping apparatus according to claim 4, wherein the acceleration time, the deceleration time and the target speed of the rotation of the servo motor are adjusted based on a reduction in the acceleration time.

6. The mold clamping apparatus according to claim 4, wherein the deceleration time of the rotation of the servo motor is adjusted to be shorter than the acceleration time.

7. The mold clamping apparatus according to claim 1, wherein the acceleration/deceleration adjustment electronic circuit is configured to adjust the acceleration time and the deceleration time of the rotation of the servo motor independently of each other.

8. The mold clamping apparatus according to claim 2, wherein the acceleration torque is a torque necessary to accelerate the rotation of the servo motor at the start of a lock-up operation, and the clamping force generating torque is a torque necessary for the toggle link mechanism to extend the tie bars during the lock-up operation, thereby generating a mold clamping force.

9. A molding apparatus comprising the mold clamping apparatus according to claim 1.

10. A molding method performed by using the molding apparatus according to claim 9, the method comprising the steps of:
adjusting the acceleration time, the deceleration time and the target speed of the rotation of the servo motor so that an acceleration torque and a mold clamping force generating torque of the servo motor are generated at different times during the mold clamping operation of the mold opening/closing mechanism; and
performing the mold clamping operation with the adjusted acceleration time, deceleration time and target speed of the rotation of the servo motor, and then filling a molding material into the clamped first mold and the second mold of the mold clamping apparatus to mold a product.

11. The mold clamping apparatus according to claim 2, wherein the acceleration/deceleration adjustment section electronic circuit is configured to adjust the acceleration time and the deceleration time independently of each other.

12. The mold clamping apparatus according to claim 3, wherein the acceleration/deceleration adjustment section electronic circuit is configured to adjust the acceleration time and the deceleration time independently of each other.

13. The mold clamping apparatus according to claim 4, wherein the acceleration/deceleration adjustment section electronic circuit is configured to adjust the acceleration time and the deceleration time independently of each other.

14. The mold clamping apparatus according to claim 5, wherein the acceleration/deceleration adjustment section electronic circuit can adjust the acceleration time and the deceleration time of the rotation of the servo motor independently of each other.

15. The mold clamping apparatus according to claim 3, wherein the acceleration torque is a torque necessary to accelerate the rotation of the servo motor at the start of a lock-up operation, and the clamping force generating torque is a torque necessary for the toggle link mechanism to extend the tie bars during the lock-up operation, thereby generating a mold clamping force.

16. The mold clamping apparatus according to claim 4, wherein the acceleration torque is a torque necessary to accelerate the rotation of the servo motor at the start of a lock-up operation, and the clamping force generating torque is a torque necessary for the toggle link mechanism to extend the tie bars during the lock-up operation, thereby generating a mold clamping force.

17. A molding apparatus comprising the mold clamping apparatus according to claim 2.

18. A molding apparatus comprising the mold clamping apparatus according to claim 3.

19. A molding apparatus comprising the mold clamping apparatus according to claim 4.

* * * * *